(12) United States Patent
Folkesson et al.

(10) Patent No.: US 12,128,760 B2
(45) Date of Patent: Oct. 29, 2024

(54) POWERTRAIN FOR A VEHICLE AND A VEHICLE

(71) Applicant: Volvo Truck Corporation, Gothenburg (SE)

(72) Inventors: Johan Folkesson, Skene (SE); Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/526,709

(22) Filed: Dec. 1, 2023

(65) Prior Publication Data

US 2024/0181872 A1    Jun. 6, 2024

(30) Foreign Application Priority Data

Dec. 6, 2022 (EP) ..................................... 22211754

(51) Int. Cl.
| | | |
|---|---|---|
| *F16H 48/08* | (2006.01) | |
| *B60K 17/16* | (2006.01) | |
| *F16H 3/70* | (2006.01) | |
| *F16H 37/08* | (2006.01) | |
| *F16H 37/04* | (2006.01) | |

(52) U.S. Cl.
CPC ............ *B60K 17/165* (2013.01); *F16H 3/70* (2013.01); *F16H 37/08* (2013.01); *F16H 48/08* (2013.01); *F16H 2037/048* (2013.01); *F16H 2200/0043* (2013.01)

(58) Field of Classification Search
CPC .... F16H 3/70; F16H 48/08; F16H 2200/0043; F16H 2037/048; F16H 37/08; F16H 37/0806; F16H 37/0813; F16H 37/082; F16H 37/0826; B60K 17/165

USPC ................ 475/230, 200, 204, 206, 207, 218
See application file for complete search history.

(56) References Cited

U.S. PATENT DOCUMENTS

| | | | | |
|---|---|---|---|---|
| 8,360,913 | B2 * | 1/2013 | Janssen | ................... F16H 3/725 475/5 |
| 9,638,296 | B2 * | 5/2017 | Versteyhe | ............. F16H 15/503 |
| 2013/0095975 | A1 * | 4/2013 | Otten | .................... F16H 37/042 475/218 |

(Continued)

FOREIGN PATENT DOCUMENTS

| | | |
|---|---|---|
| DE | 2420232 A1 | 11/1975 |
| EP | 3669100 B1 | 3/2021 |
| EP | 4170202 A1 | 4/2023 |

OTHER PUBLICATIONS

Extended European Search Report, European Application 22211754.1, mailed May 22, 2023, 17 pages.

*Primary Examiner* — Roger L Pang
(74) *Attorney, Agent, or Firm* — Sage Patent Group

(57) ABSTRACT

The disclosure relates to a powertrain for a vehicle, the powertrain including: a transmission, a propeller shaft and a differential gear, wherein the transmission comprises an output shaft which is drivingly connected or connectable to the propeller shaft, the propeller shaft is drivingly connected to the differential gear and the differential gear is configured to provide a driving torque to a respective half-shaft of a drive axle for driving the vehicle, the transmission further including: an input shaft configured to be drivingly connected to a power unit; a planetary gearset; a first gearset and a second gearset. The disclosure also relates to a vehicle.

15 Claims, 4 Drawing Sheets

(56) References Cited

U.S. PATENT DOCUMENTS

| | | | |
|---|---|---|---|
| 2015/0204430 A1* | 7/2015 | Versteyhe | F16H 37/086 475/214 |
| 2023/0117334 A1* | 4/2023 | Folkesson | F16H 37/0833 475/271 |

* cited by examiner

| | 1 | 2 | 3 | 4 |
|---|---|---|---|---|
| 1st gear | | X | X | |
| 2nd gear | | X | | X |
| 3rd gear | X | | X | |
| 4th gear | X | X | | |

POWERTRAIN FOR A VEHICLE AND A VEHICLE

CROSS REFERENCE TO RELATED APPLICATIONS

This application claims priority to European Patent Application No. 22211754.1, filed on Dec. 6, 2023, the disclosure and content of which is incorporated by reference herein in its entirety.

TECHNICAL FIELD

The disclosure relates generally to a powertrain for a vehicle. In particular aspects, the disclosure relates to a powertrain comprising a transmission, wherein the transmission comprises a planetary gearset and a number of additional gearsets. The disclosure can be applied in heavy-duty vehicles, such as trucks, buses, and construction equipment. Although the disclosure may be described with respect to a particular vehicle, the disclosure is not restricted to any particular vehicle.

BACKGROUND

Electrification of vehicles is an ongoing trend for the automotive industry. The electrification trend is not only ongoing for passenger cars but also for commercial vehicles, including heavy-duty trucks, buses, construction equipment, etc.

For large and heavy electric vehicles, i.e., vehicles including an at least partly electric powertrain, it is known to use a transmission in the powertrain. Even though there are many different known transmission types available for large and heavy vehicles, these transmissions are often adapted for traditional powertrains including internal combustion engines.

As such, there is a strive to develop improved and cost-effective powertrains for at least partly electric vehicles.

SUMMARY

According to a first aspect of the disclosure, there is provided a powertrain for a vehicle. The powertrain comprises a transmission, a propeller shaft and a differential gear. The transmission comprises an output shaft which is drivingly connected or connectable to the propeller shaft, the propeller shaft is drivingly connected to the differential gear and the differential gear is configured to provide a driving torque to a respective half-shaft of a drive axle for driving the vehicle. The transmission further comprises:
  an input shaft configured to be drivingly connected to a power unit;
  a planetary gearset comprising a sun gearwheel, one or more planet gearwheels, a planet gearwheel carrier and a planet ring gearwheel;
  a first gearset comprising a first gearwheel and a second gearwheel;
  a second gearset comprising a third gearwheel, a fourth gearwheel and a fifth gearwheel;
  wherein the first gearwheel is in driving connection with the second gearwheel, each one of the third and fourth gearwheels is in driving connection with the fifth gearwheel and wherein one of the third, fourth or fifth gearwheels is rotatably connectable or connected to the output shaft.

The transmission further comprises at least two gear engaging devices which are configured to provide at least four selectable gear connections, comprising:
  a first selectable gear connection in which the planetary gearset is internally locked;
  a second selectable gear connection in which the planet gearwheel carrier is rotatably connected to the third gearwheel;
  a third selectable gear connection in which the planet ring gearwheel is drivingly connected to the fourth gearwheel; and
  a fourth selectable gear connection in which the planet ring gearwheel is rotatably locked to a fixed member;

The planet ring gearwheel is rotatably connected or connectable to the first gearwheel and a first gear engaging device of the at least two gear engaging devices is configured to be provided in a first gear engaging device first state where the first gear engaging device rotationally connects the second gearwheel to the fourth gearwheel and in a first gear engaging device second state where the first gear engaging device rotationally disconnects the second gearwheel from the fourth gearwheel, wherein the third selectable gear connection is provided by at least setting the first gear engaging device in the first gear engaging device first state. The planetary gearset is located on a first side of a first geometric sectional plane intersecting the differential gear and at least one of the first and second gearsets is located on a second opposite side of the first geometric sectional plane.

The first aspect of the disclosure may seek to provide an improved powertrain which alleviates at least one drawback of the prior art. A technical benefit may include that the powertrain configuration solves conflicting requirements of packaging and performance. More specifically, the powertrain according to the first aspect of the disclosure may provide an energy efficient and high-performing powertrain which can be efficiently packaged in a vehicle.

By way of example, it has been realized that it is beneficial to provide a torque split, or power split, from the input shaft to the output shaft. By a power split is herein meant that instead of providing a single torque path from the input shaft to the output shaft, torque is transferred from the input shaft to the output shaft via two separate torque paths. By providing a power split for a selected gear, forces exerted on the gearwheels may be reduced compared to forces exerted on gearwheels if only one torque path was used. By the powertrain as disclosed herein, a selected gear with a power split, or torque split, will be achieved by providing the second and third selectable gear connections.

It has further been realized that it is advantageous to configure the third selectable gear connection so that the second and fourth gearwheels can be rotationally connected and disconnected. For example, it has been realized that it is advantageous to be able to rotationally disconnect a gearwheel connection as far downstream as possible, i.e., as far away as possible from the power unit. As a consequence of the configuration of the third selectable gear connection, the first gearwheel, when not taking part in transferring torque to the output shaft, may rotate with a lower rotational speed. This implies lower load-independent losses in the transmission. A further advantage of examples of the first aspect of the disclosure is that it may result in fewer gear engaging devices, implying cost-effectiveness and a compact configuration.

Moreover, by locating parts of the transmission on different sides of the first geometric sectional plane as disclosed herein, a more compact configuration may be achieved, allowing the powertrain to fit in a vehicle more easily. Thus, and as indicated above, the powertrain can be efficiently packaged in a vehicle.

By internally locking the planetary gearset is herein meant that the sun gearwheel, the planet gearwheel carrier, and the planet ring gearwheel are rotationally connected.

By the terms "rotationally connected" and "rotationally connects" is intended "connected for common rotation with". For example, in the first gear engaging device first state, the first gear engaging device connects the second gearwheel for common rotation with the fourth gearwheel around a common axis of rotation.

By a "driving connection" between two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rotationally connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

In some examples, the first and the second gearsets are located on the second opposite side of the first geometric sectional plane. Thereby, further improved packaging of the powertrain may be achieved, i.e., by locating the planetary gearset on the first side and the first and second gearsets on the second opposite side of the differential gear.

In some examples, a respective rotational axis of the input shaft and/or the output shaft is perpendicular to the first geometric sectional plane.

In some examples, the powertrain further comprises a final drive gearset which drivingly connects the propeller shaft to the differential gear.

In some examples, the final drive gearset is a bevel gearset. This may imply that the respective rotational axis of the input shaft and/or the output shaft is/are arranged perpendicular to rotational axes of the half-shafts. For example, the bevel gearset may be a hypoid bevel gearset.

In some examples, the final drive gearset comprises at least a first and second drivingly connected cylindrical gearwheels. This may imply that the respective rotational axis of the input shaft and/or the output shaft is/are arranged parallel to rotational axes of the half-shafts.

In some examples, the final drive gearset comprises a final drive first gearwheel which is drivingly connected to the differential gear, wherein the planetary gearset and the final drive first gearwheel are located so that a second geometric sectional plane which is perpendicular to a longitudinal direction of the powertrain intersects the planetary gearset and the final drive first gear wheel. Thereby, a more compact packaging of the powertrain may be achieved. The longitudinal direction of the powertrain typically corresponds to a direction of the respective rotational axis of the input shaft and/or the output shaft.

In some examples, at least one of the at least two gear engaging devices is located on the first side of the first geometric sectional plane. This may imply an improved packaging of the powertrain in a vehicle. For example, a gear engaging device for providing the fourth selectable gear connection may be located on the first side of the first geometric sectional plane.

In some examples, a second gear engaging device of the at least two gear engaging devices is configured to provide the first selectable gear connection and the second selectable gear connection. This may imply a more efficient transmission configuration, requiring fewer gear engaging devices.

In some examples, the transmission is configured to provide the fourth selectable gear connection by directly locking the planet ring gearwheel to the fixed member or by locking the planet ring gearwheel to the fixed member via the first gearwheel and/or the second gearwheel.

In some examples, the third, fourth and fifth gearwheels are arranged so that they are provided in a first common gear plane of the transmission which is perpendicular to rotational axes of the third, fourth and fifth gearwheels.

In some examples, the first and second gearwheels are arranged so that they are provided in a second common gear plane of the transmission which is perpendicular to rotational axes of the first and second gearwheels.

In some examples, the first gearset is arranged in-between the planetary gearset and the second gearset.

According to a second aspect of the disclosure, there is provided a vehicle comprising a powertrain according to any one of the examples of the first aspect of the disclosure. Advantages and effects of the second aspect of the disclosure are analogous to the advantages and effects of the first aspect of the disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

Figure 1:
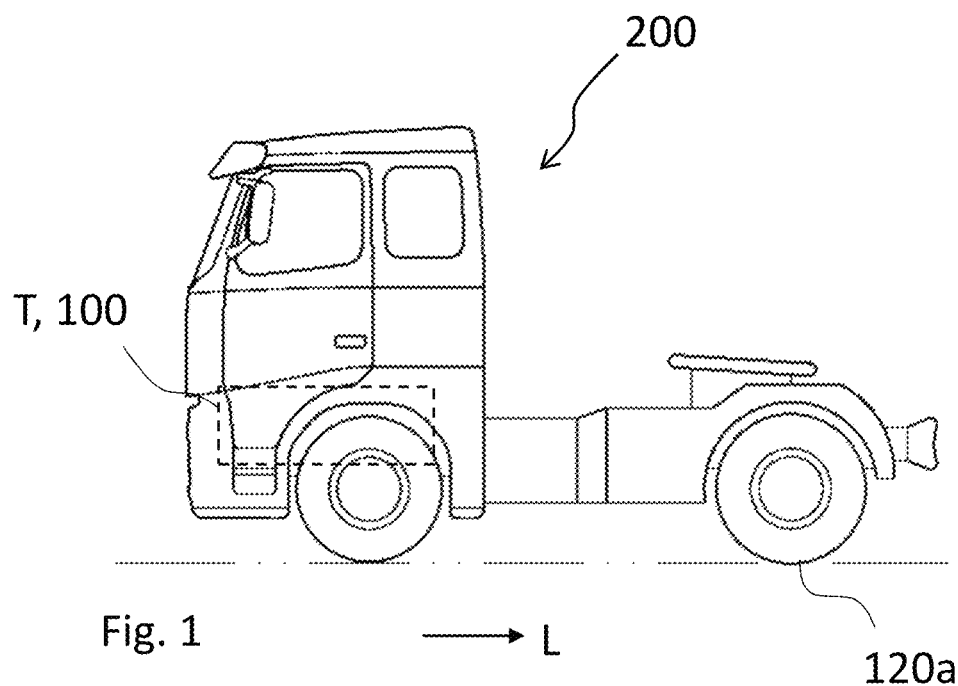
FIG. 1 is a side view of a vehicle according to an example of the disclosure.

The drawings show diagrammatic exemplifying examples of the present disclosure and are thus not necessarily drawn to scale. It shall be understood that the examples shown and described are exemplifying and that the disclosed subject matter is not limited to these examples. It shall also be noted that some details in the drawings may be exaggerated in order to better describe and illustrate the disclosure. Like reference characters refer to like elements throughout the description, unless expressed otherwise.

DETAILED DESCRIPTION

Aspects set forth below represent the necessary information to enable those skilled in the art to practice the disclosure.

The present disclosure aims to provide an improved powertrain configuration which alleviates at least one drawback of the prior art, or which at least provides a suitable alternative. For example, an object of the disclosure is to provide an improved powertrain for a vehicle which achieves at least one of the following: 1) it solves conflicting requirements of packaging and performance, 2) it is cost-effective, and 3) it enables a high degree of commonality between electric powertrains of different power levels and/or with different types of installations in vehicles.

FIG. 1 depicts a side view of a vehicle 200 according to an example of the disclosure. The vehicle 200 in FIG. 1 is a truck, or more specifically a towing truck for towing one or more trailers (not shown). The vehicle 200 may be an electric vehicle which at least partly uses electric power for propulsion. Even though an electric truck 200 is shown, it shall be noted that the vehicle may be any type of vehicle, such as a hybrid vehicle comprising an internal combustion engine and one or more electric motors for propulsion. Furthermore, the vehicle may not only be a truck. Accordingly, the vehicle could be any type of vehicle, such as a bus, a working machine, etc. The vehicle 200 comprises a powertrain 100. The powertrain comprises a transmission T. The powertrain 100 and the transmission T will be described further in the below.

Figure 2:
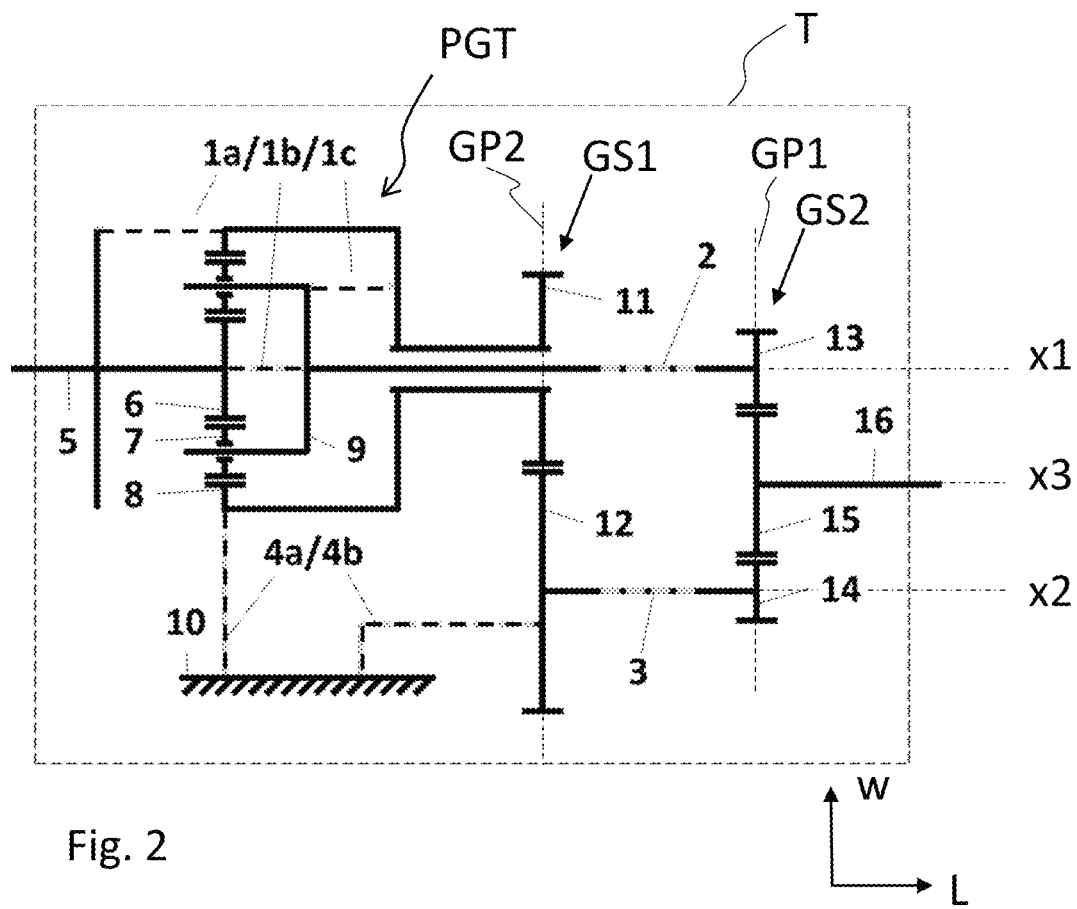
FIG. 2 is a schematic view of a transmission of a powertrain according to an example of the disclosure.

FIG. 2 depicts a transmission T according to an example of the disclosure. The transmission T is thus part of a powertrain 100 according to the first aspect, e.g., the powertrain 100 in FIG. 1. The transmission T as shown in FIG. 2 comprises:
- an input shaft 5 configured to be drivingly connected to a power unit (not shown);
- a planetary gearset PGT comprising a sun gearwheel 6, one or more planet gearwheels 7, a planet gearwheel carrier 9 and a planet ring gearwheel 8;
- a first gearset GS1 comprising a first gearwheel 11 and a second gearwheel 12; and
- a second gearset GS2 comprising a third gearwheel 13, a fourth gearwheel 14 and a fifth gearwheel 15.

The first gearwheel 11 is in driving connection with the second gearwheel 12, each one of the third and fourth gearwheels 13, 14 is in driving connection with the fifth gearwheel 15, and one of the third, fourth or fifth gearwheels 13, 14, 15 is rotatably connectable or connected to an output shaft 16. In this example, the first gearwheel 11 is in meshing engagement with the second gearwheel 12, and each one of the third and fourth gearwheels 13, 14 is in meshing engagement with the fifth gearwheel 15. However, in other examples, the driving connection may be enabled by use of at least one intermediate gearwheel in-between any two of the drivingly connected gearwheels.

Furthermore, as shown, the fifth gearwheel 15 may be drivingly connected to the output shaft 16. More particularly, the fifth gearwheel 15 may be permanently arranged to rotate with the output shaft 16. Furthermore, as shown, the fifth gearwheel 15 may be the gearwheel with the largest diameter out of the gearwheels 13, 14 and 15.

The transmission T further comprises at least two gear engaging devices (not shown in FIG. 2) which are configured to provide at least four selectable gear connections, comprising:
- a first selectable gear connection 1a-c in which the planetary gearset PGT is internally locked;
- a second selectable gear connection 2 in which the planet gearwheel carrier 9 is rotatably connected to the third gearwheel 13;
- a third selectable gear connection 3 in which the planet ring gearwheel 8 is drivingly connected to the fourth gearwheel 14; and
- a fourth selectable gear connection 4a-b in which the planet ring gearwheel 8 is rotatably locked to a fixed member 10.

The fixed member 10 may for example be a transmission housing member.

The planet ring gearwheel 8 is in the shown example rotatably connected to the first gearwheel 11. Furthermore, a first gear engaging device A3 (see FIGS. 3-5) of the at least two gear engaging devices is configured to be provided in a first gear engaging device first state where the first gear engaging device A3 rotationally connects the second gearwheel 12 to the fourth gearwheel 14 and in a first gear engaging device second state where the first gear engaging device A3 rotationally disconnects the second gearwheel 12 from the fourth gearwheel 14, wherein the third selectable gear connection 3 is provided by at least setting the first gear engaging device A3 in the first gear engaging device first state.

As further shown in FIG. 2, the third, fourth and fifth gearwheels 13, 14, 15 may be arranged so that they are provided in a first common gear plane GP1 of the transmission T which is perpendicular to rotational axes x1, x2, x3 of the third, fourth and fifth gearwheels 13, 14, 15. Still further, as shown in FIG. 2, the first and second gearwheels 11, 12 may be arranged so that they are provided in a second common gear plane GP2 of the transmission T which is perpendicular to rotational axes x1, x2 of the first and second gearwheels 11, 12. As may be gleaned from FIG. 2, a common gear plane for a number of gearwheels may mean that the common gear plane intersect material portions of each gearwheel of the number of gearwheels. In particular, the common gear plane may intersect cogs of each gearwheel of the number of gearwheels.

As further shown in FIG. 2, the planetary gearset PGT, the first gearwheel 11 and the third gearwheel 13 may be aligned with respect to the rotational axis x1, being a common rotational axis. Yet further, as shown, the second gearwheel 12 and the fourth gearwheel 14 may be aligned with respect to the rotational axis x2, also being a common rotational axis. The rotational axes x1, x2, and x3 may be parallel with respect to each other.

Figure 3:
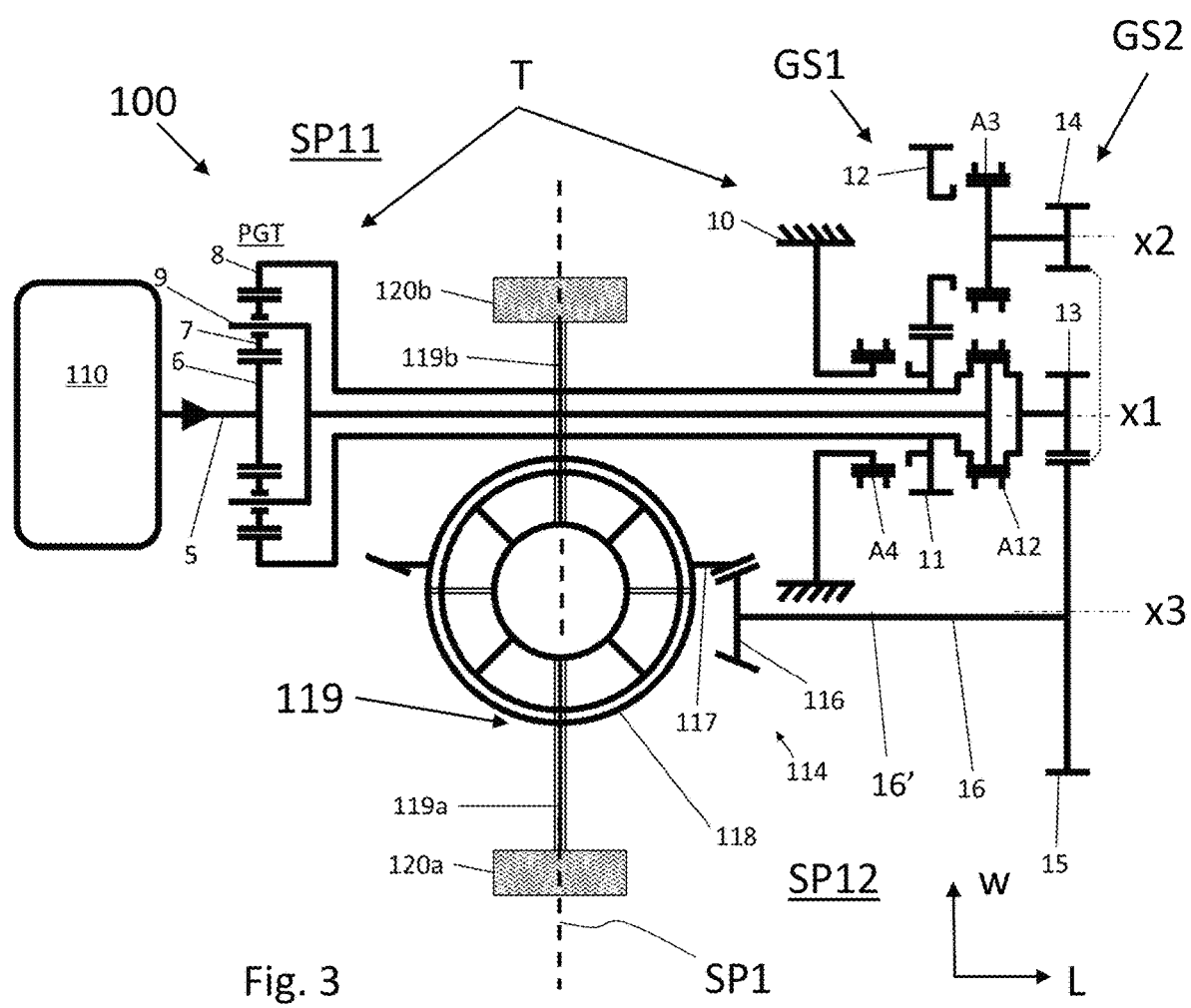
FIGS. 3-5 are schematic views of a powertrain according to examples of the disclosure.
Figure 4:
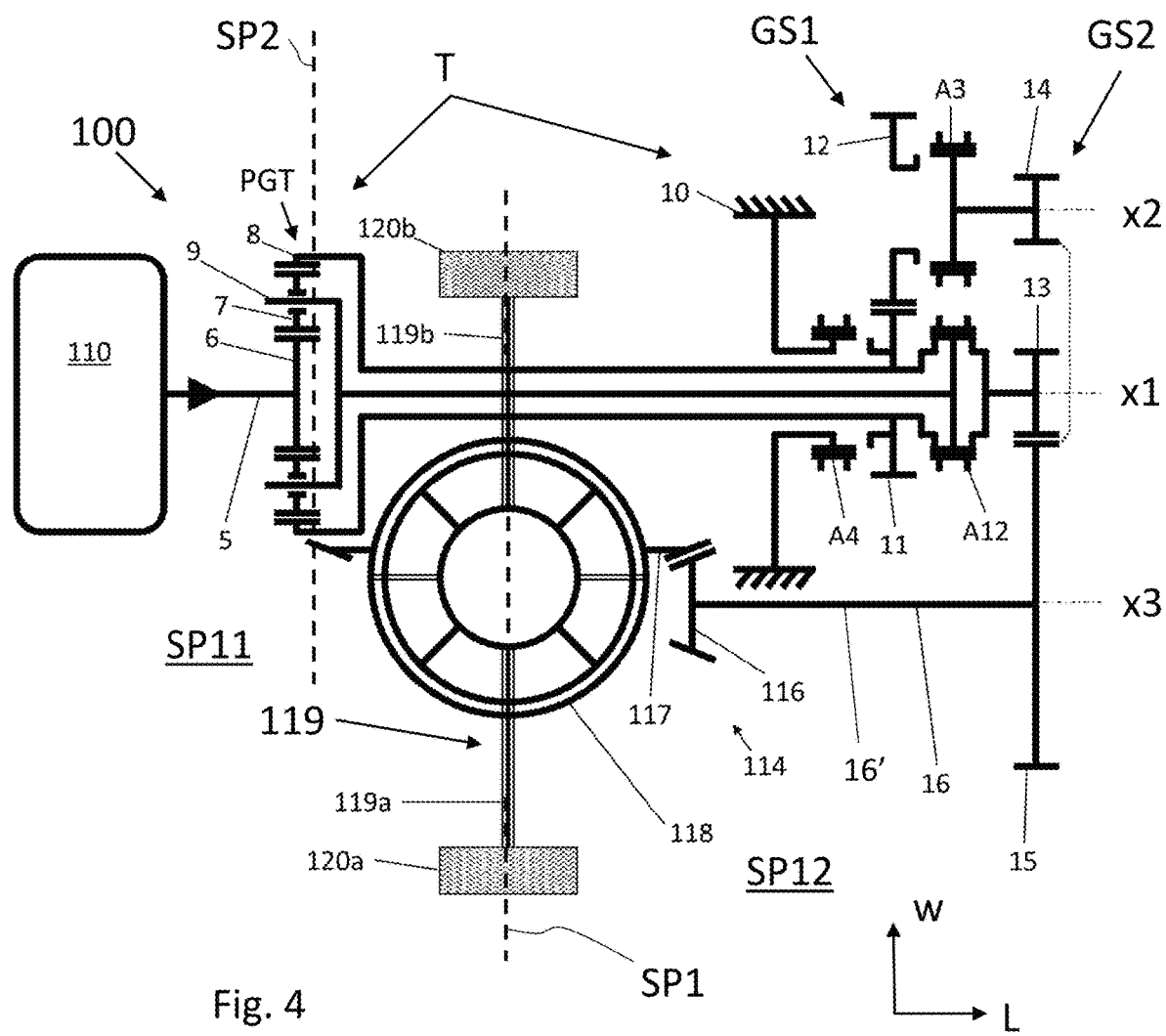
Figures 5, 6:
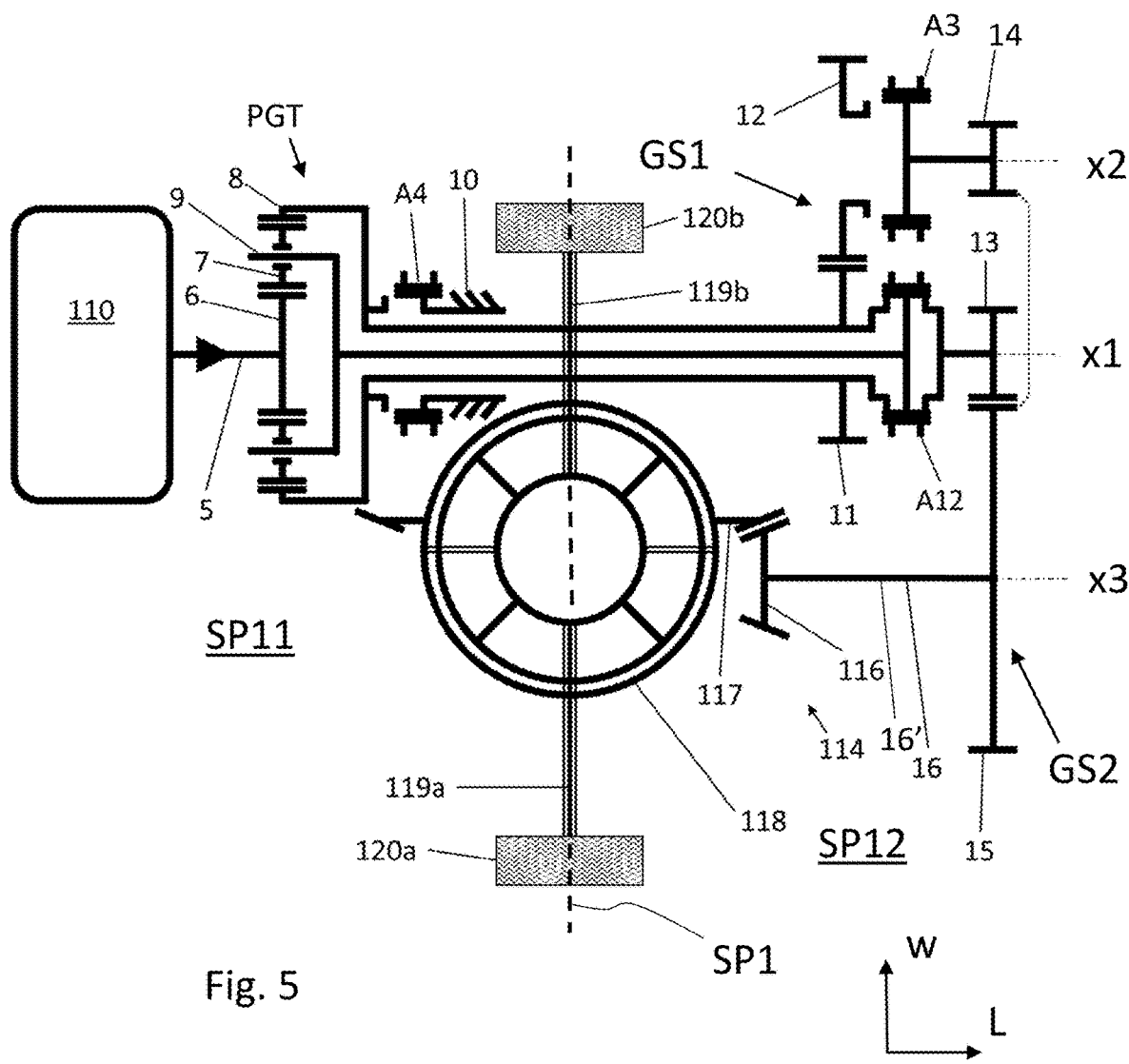
FIG. 6 is a table with a 1st to a 4th gear according to an example of the present disclosure.

FIGS. 3-5 show schematic views of examples of powertrains 100 for a vehicle 200 according to examples of the present disclosure. The powertrain 100 comprises a transmission T, herein an example of the transmission T as shown in FIG. 2. The powertrain 100 further comprises a propeller shaft 16'. In these examples, the output shaft 16 and the propeller shaft 16' are arranged as one single common shaft. It shall however be understood that the output shaft and the propeller shaft may alternatively be separate shafts which are drivingly connected or connectable, such as drivingly connected via a range gear assembly (not shown). For example, the range gear assembly may be configured to selectively provide a low range gear and a high range gear. The range gear assembly typically comprises a planetary gearset (not shown). The powertrain 100 may comprise additional members, such as a clutch member (not shown) between a power unit 110 and the input shaft 5.

The powertrain 100 further comprises a differential gear 118. The output shaft 16 is drivingly connected or connectable to the propeller shaft 16', the propeller shaft 16' is drivingly connected to the differential gear 118 and the differential gear 118 is configured to provide a driving torque to a respective half-shaft 119a, 119b of a drive axle 119 for driving the vehicle 200. As shown, wheels 120*a*, 120*b* are mounted on each half shaft 119*a*, 119*b*. In some examples, a gearing (not shown) may be provided between the respective half-shaft 119*a*, 119*b* and the respective wheel 120*a*, 120*b*. For example, the gearing may be any one of a hub reduction or a portal axle gearset. It shall be understood that not only wheels may be used but e.g., crawler members may additionally or alternatively, be used.

As mentioned in the above, the input shaft 5 is further configured to be connected to the power unit 110. According to one example, the power unit 110 forms part of the powertrain 100. The power unit 110 is typically an electric machine for driving the drive axle 119. The electric machine may also be used as a generator for e.g., charging an electric energy storage system (not shown), such as a high-voltage battery.

In the shown examples, the powertrain 100 has a longitudinal direction L and a transverse direction w which is perpendicular to the longitudinal direction L. The rotational axes x1, x2 and x3 may as shown extend along the longitudinal direction L. The longitudinal direction L of the powertrain 100 may correspond to a longitudinal direction L of the vehicle 200 and the transverse direction w of the powertrain 100 may correspond to a transverse direction of the vehicle 200. In alternative examples, the longitudinal direction L of the powertrain 100 may extend in the transverse direction of the vehicle 200.

In the examples shown in FIGS. 3-5, the driving connection between the fourth and the fifth gearwheels 14, 15 is indicated by a broken line therebetween.

As further depicted in FIGS. 3-5, the planetary gearset PGT is located on a first side SP11 of a first geometric sectional plane SP1 intersecting the differential gear 118 and at least one of the first and second gearsets GS1, GS2 is located on a second opposite side SP12 of the first geometric sectional plane SP1. As shown in FIGS. 3-5, the first and the second gearsets GS1, GS2 may be located on the second opposite side SP12 of the first geometric sectional plane SP1.

As further shown, the first geometric sectional plane SP1 may intersect a center point of the differential gear 118.

A respective rotational axis x1, x3 of the input shaft 5 and/or the output shaft 16 may as shown be perpendicular to the first geometric sectional plane SP1.

As further shown in the examples of FIGS. 3-5, the powertrain 100 may further comprise a final drive gearset 114 drivingly connecting the propeller shaft 16' to the differential gear 118. The final drive gearset 114 may as shown be a bevel gearset. For example, the bevel gearset 114 may be a hypoid bevel gearset. In an alternative example not shown, the final drive gearset may comprise at least a first and second drivingly connected cylindrical gearwheels.

The final drive gearset 114 may as shown comprise a final drive first gearwheel 117 which is drivingly connected to the differential gear 118. The final drive gearset 114 may as further shown comprise a final drive second gearwheel 116 which is drivingly connected to the propeller shaft 16'. In this example, the final drive second gearwheel 116 is mechanically coupled to the propeller shaft 16'. The final drive first gearwheel 117 is herein in meshing engagement with the final drive second gearwheel 116, and may as shown form the bevel gearset 114.

The example in FIG. 4 shows that the planetary gearset PGT and the final drive first gearwheel 117 may be located so that a second geometric sectional plane SP2 which is perpendicular to the longitudinal direction L of the powertrain 100 intersects the planetary gearset PGT and the final drive first gearwheel 117. As shown, the second geometric sectional plane SP2 may intersect cogs of the planetary gearset PGT and the final drive first gearwheel 117.

As shown in the examples of FIGS. 3-5, a second gear engaging device A12 of the at least two gear engaging devices may be configured to provide the first selectable gear connection 1*a-c* and the second selectable gear connection 2. Thereby, fewer gear engaging devices may be used. In the examples shown in FIGS. 3-5, the first selectable gear connection 1*c* is provided by rotatably connecting the planet gearwheel carrier 9 to the planet ring gearwheel 8.

The example in FIG. 5 shows that at least one of the at least two gear engaging devices is located on the first side SP11 of the first geometric sectional plane SP1. In this example, a third gear engaging device A4 is located on the first side SP11 of the first geometric sectional plane SP1. As shown in FIGS. 3-4, the third gear engaging device A4 may alternatively be located on the second side SP12 of the first geometric sectional plane SP1. The third gear engaging device A4 is in the shown examples in FIGS. 3-5 configured to provide the fourth selectable gear connection 4*a*. More specifically, in the shown examples, the transmission T is configured to provide the fourth selectable gear connection 4*a* by directly locking the planet ring gearwheel 8 to the fixed member 10. In an alternative embodiment as depicted in FIG. 2, the transmission T may be configured to provide the fourth selectable gear connection 4*b* by locking the planet ring gearwheel 8 to the fixed member 10 via the first gearwheel 11 and/or the second gearwheel 12.

As further shown in FIGS. 2-5, the first gearset GS1 may be arranged in-between the planetary gearset PGT and the second gearset GS2, as seen along the longitudinal direction L of the powertrain 100. Alternative examples are also possible, such as arranging the planetary gearset PGT in-between the first and the second gearsets GS1, GS2, or arranging the second gearset GS2 in-between the planetary gearset PGT and the first gearset GS1, as seen along the longitudinal direction L of the powertrain 100.

As another example not shown, the powertrain may comprise more than one transmission according to the first aspect of the disclosure. In such example, each input shaft of the respective transmission may be configured to be drivingly connected to a respective power unit, e.g., a respective electric machine. For example, two transmissions of such a powertrain may share the same output shaft. Still further, the two transmissions may share the same fifth gearwheel. This implies a more compact high-performance powertrain configuration. Accordingly, a third gearwheel and a fourth gearwheel of a second transmission may be in driving connection with the fifth gearwheel 15 of the transmission T. Still further, any one of the third 13, fourth 14 and fifth gearwheel 15 of the transmission T may be any one of the third, fourth and fifth gearwheel of the second transmission.

The gear engaging devices A12, A3, A4 may for example be sleeve-formed members which are connected to respective shift forks (not shown). The shift forks may be connected to actuators (not shown) which in turn may be controlled by a transmission control unit (not shown). The at least four selectable gear connections may be provided by two to four gear engaging devices.

The transmission T may be set to a power split gear state in which first and second separate torque paths between the input shaft 5 and the output shaft 16 are achieved. The first torque path extends between the input shaft 5 and the output shaft 16 via the planet ring gearwheel 8, the first gearwheel 11, the second gearwheel 12, the fourth gearwheel 14 and the fifth gearwheel 15. The second torque path extends between the input shaft 5 and the output shaft 16 via the planet gearwheel carrier 9, the third gearwheel 13 and the fifth gearwheel 15.

The power split gear state is set by providing the second and third selectable gear connections 2, 3. Accordingly, this may be set by use of the gear engaging devices A12 and A3 as described in the above. The power split gear state may be automatically set by use of the above-mentioned transmission control unit and associated actuators in response to a request to set the power split gear state.

For example, the power split gear state may refer to a "1st gear" of the transmission T.

The transmission T may for example have four different input/output speed ratios, or "gears". FIG. 6 depicts a table with four different input/output speed ratios, i.e., a 1st gear, a 2nd gear, a 3rd gear and a 4th gear. The 1st to 4th gears are provided by the above mentioned at least four selectable gear connections 1-4.

Accordingly, the 1st gear may refer to the power split mode. The 2nd gear may be provided by selecting the second selectable gear connection 2 and the fourth selectable gear connection 4, e.g., any one of 4a-b. The 3rd gear may be provided by selecting the first and the third selectable gear connections 1, 3. The 4th gear may be provided by selecting the first and the second selectable gear connection 1, 2, e.g., 2 and any one of 1a-c.

Each gear engaging device may be settable to two or three different positions, by e.g., moving each gear engaging device along the longitudinal direction L of the powertrain 100. In the examples shown in FIGS. 3-5, the gear engaging devices A3 and A4 are settable to two different positions and the gear engaging device A12 is settable to three different positions.

Each one of the 1st to 4th gears may be automatically set by use of the above-mentioned transmission control unit and associated actuators in response to a request to set the respective input/output speed ratio of the 1st to 4th gears.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A powertrain for a vehicle, the powertrain comprising:
a transmission, a propeller shaft and a differential gear, wherein the transmission comprises an output shaft which is drivingly connected or connectable to the propeller shaft, the propeller shaft is drivingly connected to the differential gear and the differential gear is configured to provide a driving torque to a respective half-shaft of a drive axle for driving the vehicle, and
the transmission further comprising:
an input shaft configured to be drivingly connected to a power unit;
a planetary gearset comprising a sun gearwheel, one or more planet gearwheels, a planet gearwheel carrier and a planet ring gearwheel;
a first gearset comprising a first gearwheel and a second gearwheel;
a second gearset comprising a third gearwheel, a fourth gearwheel and a fifth gearwheel;
wherein the first gearwheel is in driving connection with the second gearwheel, each one of the third and fourth gearwheels is in driving connection with the fifth gearwheel and wherein one of the third, fourth or fifth gearwheels is rotatably connectable or connected to the output shaft, and
wherein the transmission further comprises at least two gear engaging devices which are configured to provide at least four selectable gear connections, comprising:
a first selectable gear connection in which the planetary gearset is internally locked;
a second selectable gear connection in which the planet gearwheel carrier is rotatably connected to the third gearwheel;
a third selectable gear connection in which the planet ring gearwheel is drivingly connected to the fourth gearwheel; and
a fourth selectable gear connection in which the planet ring gearwheel is rotatably locked to a fixed member;
wherein the planet ring gearwheel is rotatably connected or connectable to the first gearwheel and wherein a first gear engaging device of the at least two gear engaging devices is configured to be provided in a first gear engaging device first state where the first gear engaging device rotationally connects the second gearwheel to the fourth gearwheel and in a first gear engaging device second state where the first gear engaging device rotationally disconnects the second gearwheel from the fourth gearwheel, wherein the third selectable gear connection is provided by at least setting the first gear engaging device in the first gear engaging device first state, and wherein the planetary gearset is located on a first side of a first geometric sectional plane intersecting the differential gear and wherein at least one of the first and second gearsets is located on a second opposite side of the first geometric sectional plane.

2. The powertrain according to claim 1, wherein the first and the second gearsets are located on the second opposite side of the first geometric sectional plane.

3. The powertrain according to claim 1, wherein a respective rotational axis of the input shaft and/or the output shaft is perpendicular to the first geometric sectional plane.

4. The powertrain according to claim 1, further comprising a final drive gearset drivingly connecting the propeller shaft to the differential gear.

5. The powertrain according to claim 4, wherein the final drive gearset is a bevel gearset.

6. The powertrain according to claim 5, wherein the bevel gearset is a hypoid bevel gearset.

7. The powertrain according to claim 4, wherein the final drive gearset comprises at least a first and second drivingly connected cylindrical gearwheels.

8. The powertrain according to claim 4, wherein the final drive gearset comprises a final drive first gearwheel which is drivingly connected to the differential gear, wherein the planetary gearset and the final drive first gearwheel are located so that a second geometric sectional plane which is perpendicular to a longitudinal direction of the powertrain intersects the planetary gearset and the final drive first gearwheel.

9. The powertrain according to according to claim 1, wherein at least one of the at least two gear engaging devices is located on the first side of the first geometric sectional plane.

10. The powertrain according to according to claim 1, wherein a second gear engaging device of the at least two gear engaging devices is configured to provide the first selectable gear connection and the second selectable gear connection.

11. The powertrain according to according to claim 1, wherein the transmission is configured to provide the fourth selectable gear connection by directly locking the planet ring gearwheel to the fixed member or by locking the planet ring gearwheel to the fixed member via the first gearwheel and/or the second gearwheel.

12. The powertrain according to according to claim 1, wherein the third, fourth and fifth gearwheels are arranged so that they are provided in a first common gear plane of the transmission which is perpendicular to rotational axes of the third, fourth and fifth gearwheels.

13. The powertrain according to according to claim 1, wherein the first and second gearwheels are arranged so that they are provided in a second common gear plane of the transmission which is perpendicular to rotational axes of the first and second gearwheels.

14. The powertrain according to according to claim 1, wherein the first gearset is arranged in-between the planetary gearset and the second gearset.

15. A vehicle comprising a powertrain according to claim 1.

* * * * *